K. A. AHLBOM.
MILKING MACHINE.
APPLICATION FILED DEC. 16, 1909.
958,685.
Patented May 17, 1910.
3 SHEETS—SHEET 1.
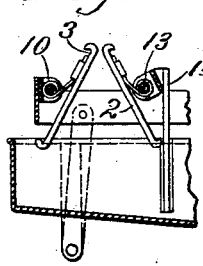
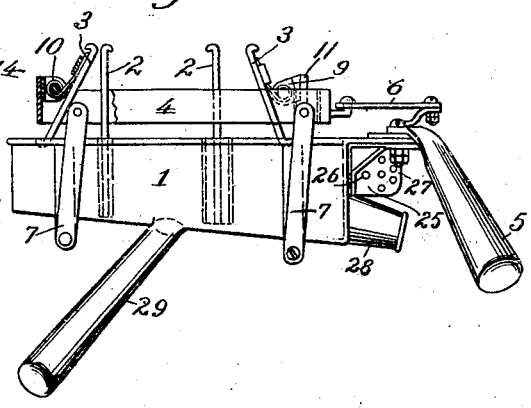
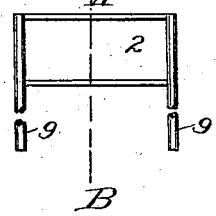
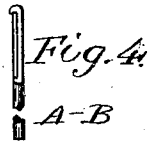
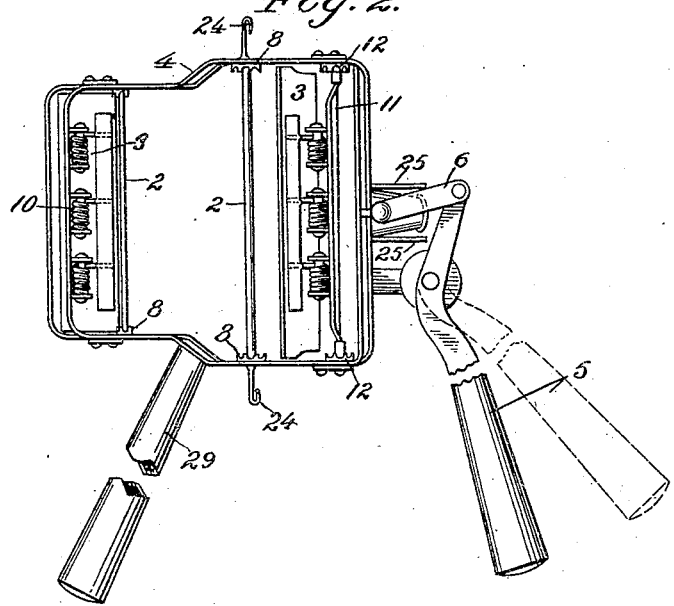
Witnesses
Inventor
Karl A. Ahlbom,
B. Singer,
Attorney

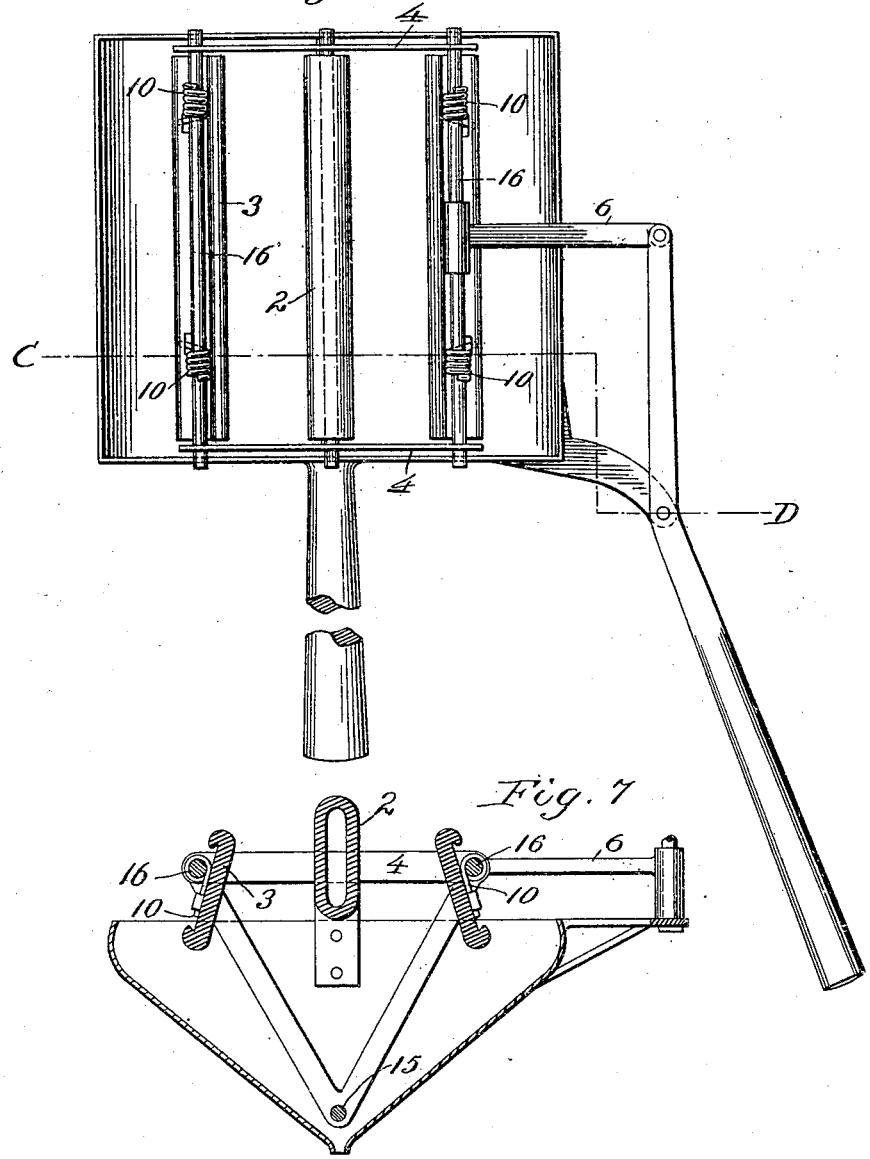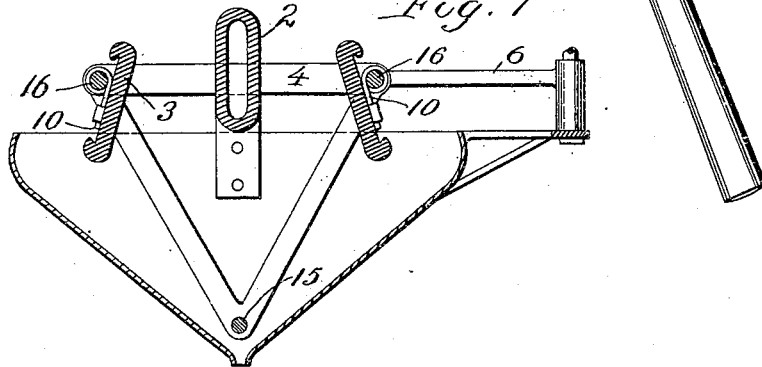

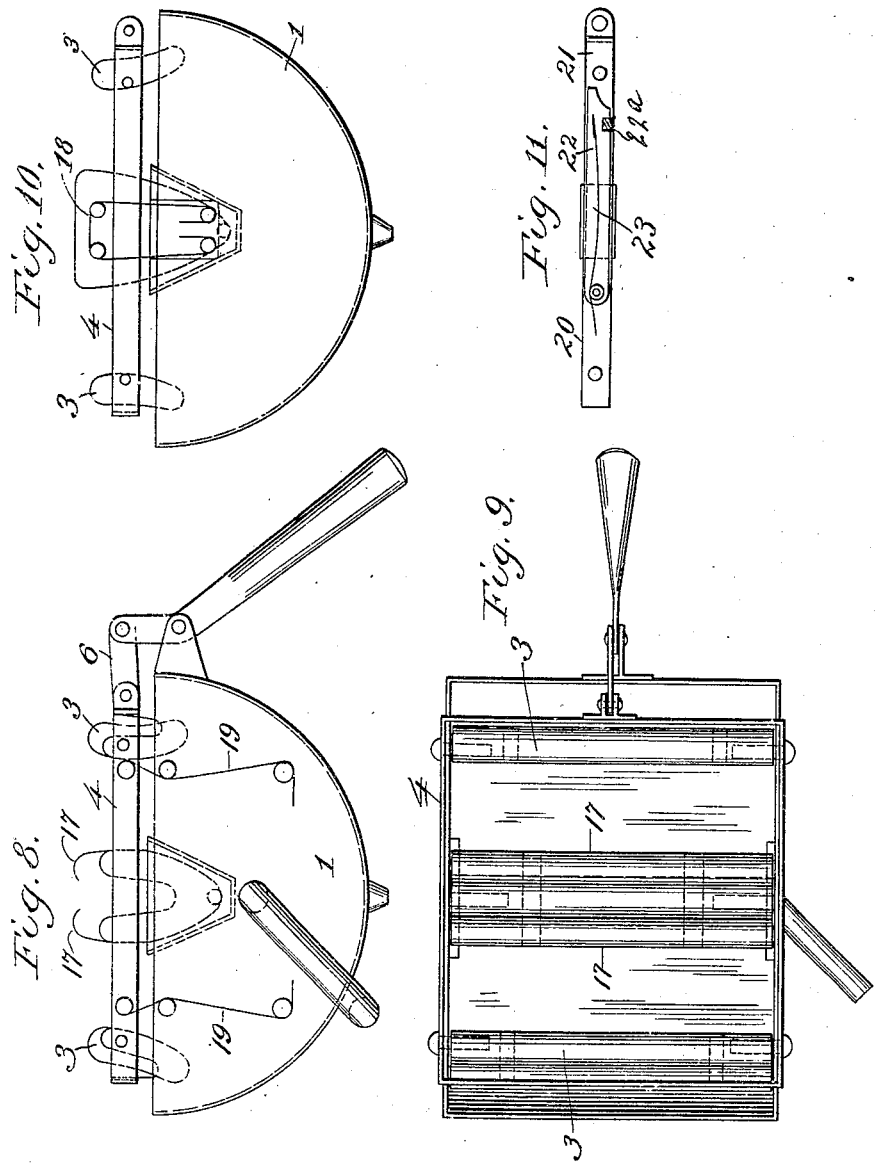

UNITED STATES PATENT OFFICE.

KARL AUGUST AHLBOM, OF STOCKHOLM, SWEDEN.

MILKING-MACHINE.

958,685.         Specification of Letters Patent.     Patented May 17, 1910.

Application filed December 16, 1909. Serial No. 533,439.

*To all whom it may concern:*

Be it known that I, KARL AUGUST AHLBOM, a subject of the King of Sweden, and resident of Stockholm, Sweden, have invented a certain new and useful Improvement in Milking-Machines, of which the following is a specification.

This invention relates to milking machines and is substantially characterized by a receptacle carrying lips, which serve to press out milk from the dugs of the cow, so that the said receptacle receives the milk directly, the said lips pressing the dugs together firstly at the top or the root and then successively downward as in milking by hand. Such a milking machine is illustrated in the annexed drawings, where—

Figure 1 is a side view of a form of such a machine and Fig. 2 is a plan view of the same. Fig. 3 shows in detail one of the lips and a frame carrying the same, and Fig. 4 is a vertical section on the line A—B in Fig. 3. Fig. 5 shows a part of the machine with a modified arrangement of the lips. Fig. 6 is a plan view of another form of the machine and Fig. 7 is a section on the line C—D in Fig. 6. Figs. 8 and 10 are end views of two other modifications of the machine and Fig. 9 is a plan view of Fig. 8. Fig. 11 shows a detail.

1 denotes the receptacle, which in the case shown has two pairs of lips 2, 3, of which the one pair is intended to include the fore and the other pair to include the rear dugs of the cow. As shown in Fig. 1, the one lip 2 of each pair is fixed, the other lip 3 being movable to and from the fixed lip and being, by means of a spring or the like, held obliquely upward and in a direction toward the fixed lip, so that the same, when its upper edge strikes against the dug, will be turned, thereby pressing upon the dug from above and then successively downward as in milking by hand. Operation of the movable lips is caused by a frame 4, which is moved there and back on the receptacle by means of a lever, the one arm of which constitutes a handle 5, the other arm being, by means of a link, connected to the frame 4. This frame is suitably mounted so that the same is pivotally carried by arms 7 movably connected to the receptacle so as to swing to and fro. The fixed lips are suitably seated in grooves 8 in the sides of the receptacle; these fixed lips rest, by means of feet 9, against the bottom of the receptacle. The lips 3, movable to and fro are connected to the frame 4 by means of spiral springs 10 arranged to press their upper edges against their respective fixed lips, there being abutments for preventing the springs from moving out of an oblique position. The springs of the one lip 3 are not directly secured to the frame 4 but to a cross piece 11, which is set down in grooves in the sides of the frame 4. Two or more such grooves 12 and two or more grooves 8 for the corresponding fixed lip may be provided in order that it may be possible to arrange one pair of lips nearer to or farther from the other pair of lips, so as to regulate the distance between the pairs of lips according to the distance between the fore and the rear dugs of the cow.

If desired, the lips 2 may, as shown in Fig. 5, be mounted to be turned or swung in the same manner as the lips 3, the same being however not journaled on the frame 4 but by means of springs 13, on a cross piece 14 disposed in two of the grooves 8, the said springs keeping the lips 2 obliquely upward and forward in direction toward the lips 3, which take up a corresponding oblique position.

In the modification shown in Figs. 6 and 7 there is only one fixed intermediate lip 2, while the frame 4, carrying the lips 3, is movable on a spindle 15 secured to the receptacle. The frame is in this case suitably formed of two triangular end pieces with the one corner turned downward and mounted on the spindle, the upper ends being connected by means of cross bars 16. A cross wall is connected to the end walls of the receptacle, which wall forms the fixed middle wall 2. The lips 3 embrace by means of an ear (each one movably) the bars 16 in such a manner that the same, with their upper and lower edges, can be turned in direction toward the middle lip, which can be removed.

According to Figs. 8 and 9 the middle lip, shown in Figs. 6 and 7, is replaced by two lips 17 of metal plate and movable in direction toward and from the side lips 3 respectively turnable on an axis at their lower edges. According to Fig. 10 the middle lip consists of a bent metal plate 18, which turns on a horizontal axis. In the forms shown in Figs. 8 and 9 the middle lip is removable, the same having end pieces, provided with heels, engaging in grooves in the inside of the receptacle. The side lips are suitably also made removable. The frame 4, according to Figs. 6 and 7, is triangular and is journaled in the receptacle. According to Fig. 8, frame 4 is carried by springs 19 secured on the outsides of the end walls of the receptacle.

As it sometimes might be difficult to insert the dugs between the lips, it is desirable to divide the frame in a direction parallel to the longitudinal direction of the lips and loosely connect the parts with each other, so that it will be possible to separate the lips for inserting the dugs. A form for this purpose is shown in Fig. 11, where 20 and 21 designate the two parts of the frame, part 20 having a hook 22 pivoted thereon, a guide-way being formed between the two latter for the part 21. The hook engages a lug 22ª projecting from part 21, and the parts are held together by a spring 23.

The machine now described is intended to be carried by the cow by means of two belts (not shown) running over the back of the cow and of which belts the rear is intended to be secured to hooks 24 projecting from the receptacle, while the fore belt is intended to be secured to a bar, not shown, which bar projects forward from the receptacle. This bar is inserted between two ears 25 on the fore end of the receptacle by means of two pins, of which one passes through a hole 26 in the ears and a corresponding hole in the bar, the other pin passing through one or more holes 27 in the ears and a corresponding hole in the bar. The provision of a plurality of holes 27 has for the purpose to make it possible to adjust the bar at different angles to the receptacle, so that this latter always can be suspended in a suitable position. It may finally be remarked that the receptacle is provided with a special outlet pipe 28 for milk, which pipe can lead to a collecting vessel. This outlet pipe can however be replaced by a handle 29 for holding the machine, which handle is hollow and communicates with the receptacle.

I claim—

1. A milking machine comprising in combination, a receptacle provided with an outlet, a plurality of pairs of coacting lip members arranged to embrace the dugs of the animal, one member of each pair being rigidly and adjustably mounted on the receptacle and the other coacting member of each pair being normally and yieldingly supported with its upper edge in closer relation to its coacting members than its lower edge, and actuating mechanism for effecting initial pressure of the upper edges of the pairs of lip members alternately near the base of the dug and gradually and successively extending the pressure on the dugs throughout the length thereof.

2. In a milking machine, a receptacle, a reciprocatory frame mounted above and pivotally connected to said receptacle, a stationary lip adjustably mounted upon said receptacle, and a movable lip pivotally connected to said frame by means of a spring, to coöperate with said stationary lip.

3. In a milking machine, a receptacle, a movable frame, links pivotally connected to said frame and receptacle, a stationary lip adjustably mounted within said receptacle, a movable lip pivotally connected to said frame, a spring for normally holding said movable lip in an inclined position, and means to reciprocate said frame.

4. In a milking machine, a receptacle, a movable frame mounted above said receptacle, a movable lip mounted upon said frame, means for yieldingly holding said movable lip in a normal inclined position, said receptacle being provided with grooves, and a stationary lip removably mounted within said grooves to coöperate with said movable lip.

5. In a milking machine, a receptacle, a movable frame mounted above said receptacle, a movable lip, a spring for pivotally connecting said movable lip to said frame and for yieldingly holding the same in a normal inclined position, said receptacle being provided with series of spaced grooves upon opposite sides thereof, and a stationary lip adapted to be inserted within a selected pair of said grooves by a substantially vertical movement of the same, to coöperate with said movable lip.

6. In apparatus of the character described, a receptacle, a movable frame comprising relatively adjustable sections mounted to reciprocate above said receptacle, a stationary lip mounted upon said receptacle, and a movable lip mounted upon said frame, to coöperate with said stationary lip.

7. In a milking machine, a receptacle, an extensible movable frame connected to said receptacle, a stationary lip connected to said receptacle, and a movable lip connected to said frame, to coöperate with said stationary lip.

In testimony whereof I affix my signature in presence of two witnesses.

KARL AUGUST AHLBOM.

Witnesses:
JULIA E. HAURIN,
MARIA LUNDBLAD.